Dec. 27, 1966          A. F. GLEDHILL          3,293,909
                    HIGH TEMPERATURE STRAIN GAGE
Filed June 10, 1964                          2 Sheets-Sheet 1

INVENTOR.
ALVIN F. GLEDHILL
BY
AGENT

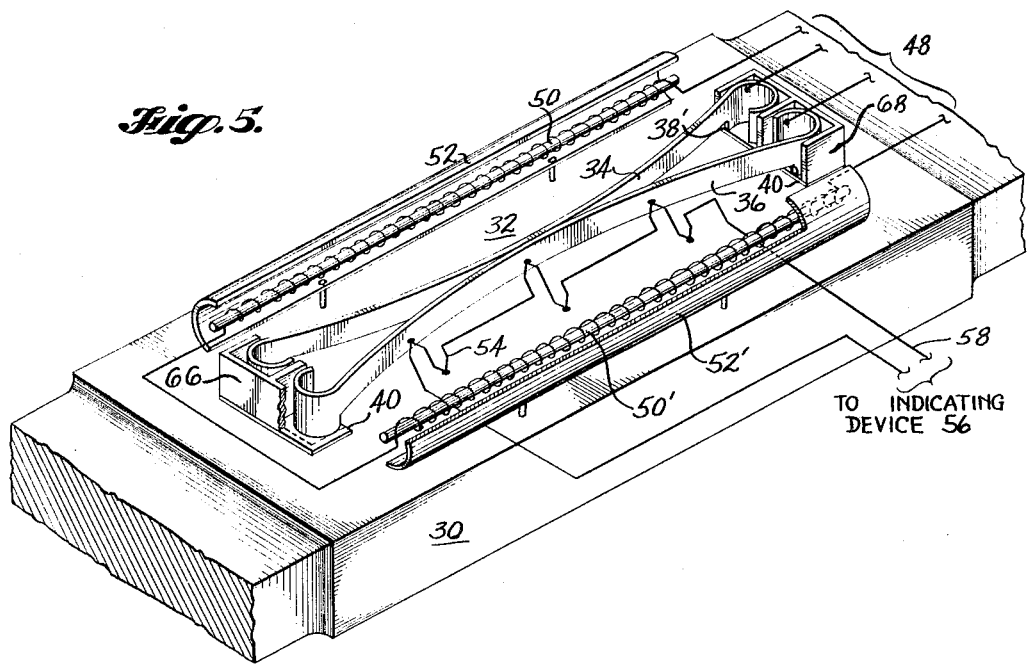

United States Patent Office 3,293,909
Patented Dec. 27, 1966

3,293,909
HIGH TEMPERATURE STRAIN GAGE
Alvin F. Gledhill, Seattle, Wash., assignor to The Boeing Company, Seattle, Wash., a corporation of Delaware
Filed June 10, 1964, Ser. No. 373,927
2 Claims. (Cl. 73—88.5)

The present invention relates to a strain gage, and more particularly to a strain gage suitable for use in a high temperature environment. Past attempts to accomplish such measurements have been largely centered around the extension of the allowable operating temperature range of the conventional electrical resistance strain gage. This prior art gage utilizes the relation between mechanical strain and the value change of an electrical resistor used as the sensitive element of the gage; however, the resistance changes are not only affected by the strain applied but also by the temperature environment. Besides the resistance changes at high temperatures, the material of the electrical resistor becomes increasingly susceptible to permanent changes, so called "drift effect."

Existing temperature compensation devices used as a complementing device to prior art electrical resistance strain gages are only adequate for low temperature and become rapidly inaccurate for higher temperatures.

Therefore in order to measure stain or deflection of a specimen at temperatures of 1000° F. or higher, the aforementioned prior art strain gage system will not suffice as accurate strain measuring devices.

The present invention proposes an entirely different system of strain measuring by making use of a temperature and expansion relationship in a null-type arrangement.

Accordingly it is an object of the present invention to provide a strain gage for use at temperatures exceeding 1000° F. and which is relatively simple in construction but highly sensitive and accurate.

Another object of the invention is to provide a strain gage which is mounted directly on the specimen to be tested and which in operation is not adversely affected at elevated temperatures.

The exact nature and operation of this invention as well as other objects and advantages thereof will be readily apparent from the following description and accompanying drawings in which:

FIG. 5 is an isometric illustration of the high temperature strain gage as shown schematically in FIG. 3.

Figure 1:
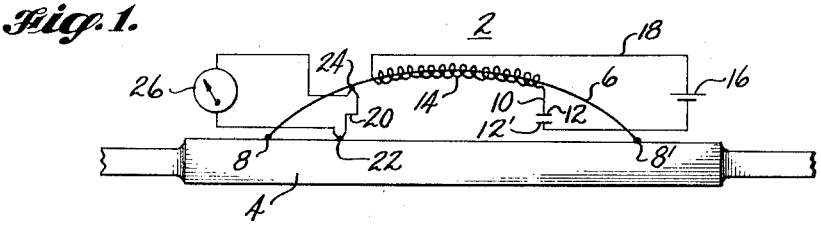
FIG. 1 is a side view of a schematic illustration showing a flexible leaf mounted on a specimen.
Figure 2:
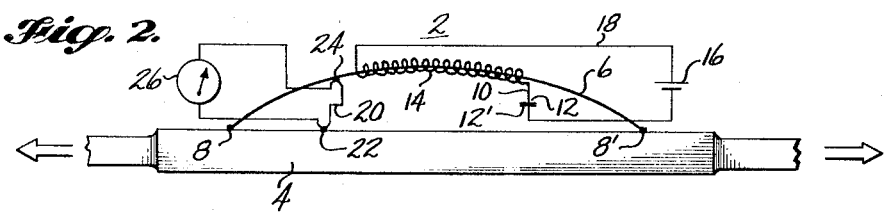
FIG. 2 is a side view of a schematic illustration showing the same specimen having a certain strain applied thereto.

Referring now to the drawings, wherein like reference characters designate corresponding parts throughout the several views, there is shown in FIG. 1 and FIG. 2, a schematic side elevation of a strain gage 2 mounted on a specimen 4, however, it is not intended to represent a practical design of the strain gage but only to illustrate and clarify the basic principles of this invention.

The sensitive element of the strain gage 2 comprises a thin leaf flexure 6 made of the same material as the specimen 4 to be tested. The thin leaf flexure is attached at gage points 8 and 10, to the specimen 4. A switch 10, having two electrical contacts 12 and 12' is connected between the leaf flexure 6 and the specimen 4 in such a way that movements of the leaf flexure 6 will operate the switch 10 so as to close or open the contacts 12 and 12'. The electrical contacts 12 and 12', when in the circuit closed position, electrically connect a heater element 14, which is mounted about the leaf flexure 6, to an electrical energy unit 16 through an electrical circuit 18.

A thermocouple 20, having a junction 22 attached to the specimen 4 and a junction 24 attached to the leaf flexure 6, is connected to an indicating device 26 which is calibrated to measure mechanical strain values.

Having thus described the various components shown in FIG. 1 and FIG. 2 it will be evident that the sensitive element of the proposed strain gage comprises the leaf flexure 6, which is attached to the specimen 4 at the gage points 8 and 10 and installed in such a way that its curvature is in a direction which insures that any shortening of the structure gage length will cause the apex of the leaf flexure 6 to move away from the specimen 4 surface.

This leaf flexure 6 provides a very great magnification between motion along the gage length and "buckling deflection" of the leaf flexure 6 normal to the gage length. Unfortunately, this magnification falls off rapidly as the strain increases. For this reason a null-type system is desirable to keep the leaf flexure 6 in its sensitive position which requires that, as the specimen strain tends to flex the leaf away from its sensitive position, a feedback action should be provided to return the leaf flexure 6 to its initial position. Electrical heating of the leaf flexure 6 provides a very simple and effective method for accomplishing this "nulling action" and provides also a ready means for generating a strain dependent signal which is accomplished by a thermocouple 20. This thermocouple 20 is attached with its junction points 22 and 24 to the specimen 4 and leaf flexure 6 respectively and will respond to the temperature difference between the leaf flexure 6 and the specimen 4, which automatically cancels the temperature strain in the specimen 4 and thus gives a signal proportional to the mechanical strain, provided, of course, that the leaf flexure 6 is made of the same material as the specimen 4.

The basic principles of operation of this invention are described hereinafter.

Assuming now that there exists an environmental temperature affecting both the leaf flexure 6 and the specimen 4 equally, then this temperature environment will not result in creating any relative motion between the contacts 12 and 12', because as was mentioned before, the specimen 4 and the leaf flexure 6 are made of the same material and thus have the same expansion properties, however any mechanical tensile strain applied to the specimen 4 will cause the switch contacts 12 and 12' to close and thereby energize the heater element 14.

As was assumed, the environmental temperature affects both leaf and specimen equally; however, in practical applications an equal temperature condition is normally impossible, but even so, an unequal temperature condition between the leaf flexure 6 and the specimen 4, providing both are in the same temperature environment, would not change the principle of operation of this invention and will not result in creating any relative motion between the contacts 12 and 12'. The strain applied will cause the switch contacts 12 and 12' to close the electrical circuit 18 resulting in energizing the heater element 14. The temperature of the heater element 14 will cause the leaf flexure 6 to expand and open the contacts 12 and 12' of the switch 10, and at that moment the leaf flexure 6 will be at a certain temperature, different from that of the specimen 4. Thermocouple junctions 22 and 24 will generate a signal proportional to this certain temperature difference between the leaf flexure 6 and the specimen 4 and accordingly this signal will provide a reading of mechanical strain at the indicating device 26.

Figure 3:
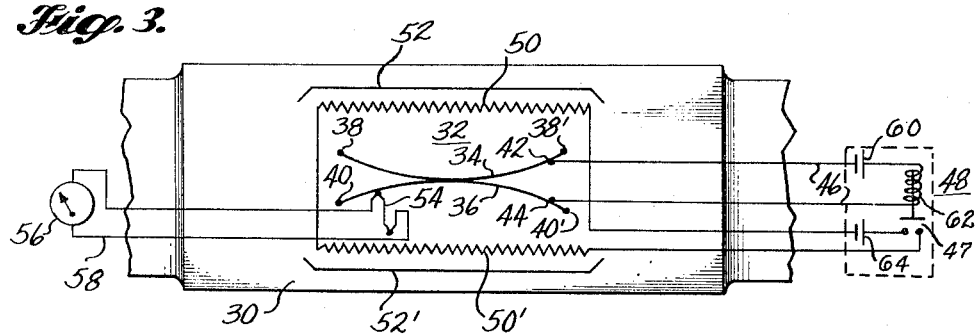
FIG. 3 is a plan view and illustrates schematically a practical embodiment of this invention, having two flexures, and in which there is no strain applied to the specimen.
Figure 4:
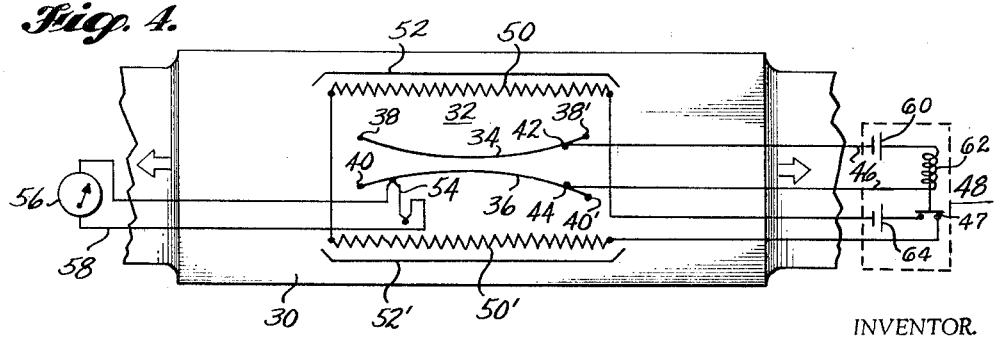
FIG. 4 is a plan view and illustrates the behavior of the flexures when a certain strain is applied to the specimen.

Because, in practical applications, the electrical current required to operate the heater element 14 is too high with respect to the contacts 12 and 12′, and because of the arrangement of the heating element 14 shown about the leaf flexure 6, which is for several reasons undesirable and inefficient, a practical modification based on the same principle is shown schematically in FIGS. 3 and 4 and an operable working device is shown in the isometric illustration of FIG. 5.

Referring now to FIG. 3, a specimen 30 is provided with a high temperature strain gage 32 having a pair of flexures 34 and 36, each attached to the specimen 30 at gage points 38 and 38′ and 40 and 40′ respectively.

The flexures 34 and 36 are so positioned that the apex of the convex surfaces are in contact and thus provides electrical conductance between both flexures in this position. Flexures 34 and 36 are provided with electrical connection points 42 and 44 respectively. Circuit means 46 is provided for connecting the flexures 34 and 36 at the connection points 42 and 44, to an electrical control unit 48.

The electrical control unit 48, in response to the positioning of the flexures 34 and 36, is capable of operating the heater elements 50 and 50′ which are installed adjacent and parallel to the flexures 34 and 36 respectively.

Optional reflector means 52 and 52′ are installed for reflecting and radiating the heat induced in the electrical heater elements 50 and 50′, in a concentrated heat beam towards the flexures 34 and 36.

Thermal sensing means 54, such as a thermocouple, or a thermopile for measuring the average temperature of the gage 32, and capable of transducing the temperature difference into a strain signal, is connected between one of the flexures 36 and the specimen 30. Strain indicating means 56, located remotely from the gage 32 is connected by electrical circuit means 58 to the thermosensor means 54.

As shown in FIG. 3 and FIG. 4, the electrical control unit 48 comprises an electrical energy unit 60 having a relatively low electrical signal for operating the electrical relay switching means 62, and a high electrical energy unit 64 to operate the heaters 50 and 50′. However, it should be understood that the electrical control unit 48 as shown could be replaced by any type of control circuit in order to accomplish the desired result.

Assuming now that there exists an environmental temperature of 1000° F. or more affecting both the flexures 34 and 36 and the specimen 30 equally or unequally (which does not change the basic principles), then this temperature will not produce any considerable changes in the set up as shown in FIG. 3. However, as soon as a mechanical tensile strain is applied to the specimen 30, the flexures 34 and 36 will tend to straighten their curvatures as shown in FIG. 4.

The apexes of the convex surfaces of the flexures 34 and 36 will detach their contact and thus the electrical circuit 46 will be interrupted. Accordingly electrical relay 62 will be de-energized and close the electrical heater circuit 47, thereby energizing heater elements 50 and 50′. The heater elements 50 and 50′ will induce heat which is radiated by the reflectors 52 and 52′ toward the flexures 34 and 36 which causes them to expand. Expansion of the flexures 34 and 36 will re-establish contact between the apexes of the convex surfaces of the flexures 34 and 36, and thus close the circuit 46 and energize electrical relay 62 which in turn de-energizes the heater elements 50 and 50′. The temperature difference, at the moment the heaters 50 and 50′ are so de-energized, that exists between the flexures 34 and 36 and the specimen 30, will be registered as a signal through the thermosensor 54 and accordingly will produce a measurement of strain at the indicating means 56.

As was described before with reference to FIGS. 1 and 2, the "nulling action" is provided by the heaters 50 and 50′ in conjunction with flexures 34 and 36.

An actual working device of the high temperature strain gage is isometrically illustrated in FIG. 5. The flexures 34 and 36 are mounted on holding members 66 and 68 which are made from an electrical and temperature insulating material and which are mounted on the specimen 30.

In order to get an average temperature of the flexures, a thermopile arrangement 64 is installed between the specimen 30 and flexure 36 as shown (not shown between flexure 34 and specimen 30).

A description of the device as illustrated in FIG. 5 is deemed to be unnecessary since the operation is essentially the same as the apparatus shown schematically in FIGS. 3 and 4.

In most cases the materials to be strain measured have a linear temperature expansion relationship. However, in materials such as René 41, the temperature expansion relationship is non-linear and thus accurate strain measurement can be achieved by monitoring the absolute temperature level of the specimen and by applying a suitable correction in order to compensate for the consequent change in calibration with temperature.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

I claim:

1. A strain measuring apparatus for test material subjected to stress comprising in combination:
 (a) a pair of electrically conductive flexible leaves made out of the same material as the test material, each of said leaves having their end portions mounted on the test material at spaced apart locations and in such a way that said leaves are located parallel with one another and their middle portions are oppositely curved and in contact with one another, said leaves flexing away from one another when a tensile force is applied to said test material thus effecting a separation of said middle portions;
 (b) electrical heater elements installed adjacent to said leaves for selectively heating said leaves;
 (c) electrical power and control means electrically connecting said leaves and said heater elements for energizing said electrical heater elements upon separation of said middle portions to effect a temperature rise in said leaves causing them to expand and flex toward one another until said middle portions reestablish contact with one another and de-energize said heater elements;
 (d) combined thermal sensing means and strain indicator means connected to said leaves and the test material for sensing the temperature difference between said leaves and the material and for converting said difference into a strain indication.

2. An apparatus for measuring strain in a test specimen comprising:
 (a) an elongated, electrically conductive, flexible strip;
 (b) means for mounting said flexible strip on said test specimen in such a manner that the application of stress to said test specimen will cause said flexible strip to flex;
 (c) an electrical heater element disposed adjacent to said strip for selectively heating said strip;
 (d) electrical power means for selectively energizing said electrical heater element to effect a temperature rise in said heater element and said adjacent flexible strip;

(e) switch means disposed between said heater element and said electrical power means and operative in response to flexure of said flexible strip to electrically connect said electrical power means to said electrical heater element and effect a temperature rise in said heater element and said flexible strip; and (f) combined thermal sensing means and strain indicator means connected to said flexible strip for sensing the temperature rise in said flexible strip and for converting the rise into a strain indication.

References Cited by the Examiner

UNITED STATES PATENTS

| | | | |
|---|---|---|---|
| 1,855,613 | 4/1932 | Smith | 73—89 |
| 1,989,828 | 2/1935 | Smulski | 73—363 X |
| 2,316,975 | 4/1943 | Ruge | 73—88.5 X |
| 2,426,390 | 8/1947 | De Forest | 73—88.5 X |
| 2,664,481 | 12/1953 | Pearl et al. | 73—363 X |
| 2,709,233 | 5/1955 | Hage | 73—89 X |
| 2,846,646 | 8/1958 | Van Santen | 73—88.5 X |

RICHARD C. QUEISSER, *Primary Examiner.*

C. A. RUEHL, *Assistant Examiner.*